ARTHUR SIMON
FREDRICK E. SHIRK
JOHN C. BIAGIOLI
INVENTORS

BY
Claude Funkhouser
ATTORNEY

CODE MATRIX

ARTHUR SIMON
FREDRICK E. SHIRK
JOHN C. BIAGIOLI
INVENTORS

United States Patent Office 3,388,379
Patented June 11, 1968

3,388,379
TRACE IDENTIFIER
Arthur Simon, Silver Spring, and Frederick E. Shirk, Baltimore, Md., and John C. Biagioli, Phoenixville, Pa., assignors to the United States of America as represented by the Secretary of the Navy
Filed Mar. 24, 1964, Ser. No. 354,489
19 Claims. (Cl. 340—147)

ABSTRACT OF THE DISCLOSURE

In a multi-channel FM signal processing unit, a trace identifier for placing channel numbers, in binary coded form, on oscillograph records obtained when calibrating the plurality of channels. First, a series of galvanometers, equal in number to the number of channels, are calibrated by connecting an equal number of known-frequency calibrating oscillators into the circuit of the signal processing unit. The trace identifier, which issues binary coded frequency modulated identifying numbers to each of the respective channels, is then switched into the circuit. The result is that each channel, which corresponds to a different center frequency, is easily recognized by means of its associated binary identifying number.

---

This invention relates generally to identification of FM subcarrier channels, and more specifically to an improved trace identifier for use in FM-FM processing.

Recent advances in space technology has spurred tremendous growth in that area. Along with the inception of guided missiles and satellites there developed the need to transmit and process signals containing information which these satellites and missiles were capable of providing. Telemetering provided the answer to the transmission problem, and numerous ground and shipboard installations helped to alleviate receiving and processing problems. However, many problems remained to be solved, and many others will be encountered when solutions to existing problems are obtained.

The present invention was developed in response to an existing problem in various processing facilities. Many processing stations receive telemetered data on tapes; the information often appears as FM modulation on subcarrier channels. The signals from these tapes are fed into discriminators, and the telemetered information is sent to galvanometers for recording on oscillograph records. In order for these oscillograph records to be of value the galvanometers must first be calibrated. One method of calibration is to feed signals from calibration oscillators (which correspond to the various channel bands of the signals on the tapes) to the galvanometers, and then calibrate them with the known frequencies of the calibration oscillators. An oscillograph record is then made of the calibration signals fed to said galvanometers. One type of calibration is known as "three-point" calibration. In this method the galvanometers are calibrated to the center frequency, and the upper and lower band edges of their respective channels. The distances between the upper band edge, center frequency, and lower band edge on the oscillograph record is proportional to the frequency differences between the three levels, i.e., upper and lower band edges, and center frequency.

One difficulty often encountered is operator error which prevents calculation of the various signal frequencies recorded on the oscillograph records. After the galvanometers have been calibrated the calibration signals are disconnected and the data signals from the tapes are patched into place. The operator may mistakenly believe that a galvanometer was patched to receive a particular band when in fact it was patched to receive another band. If this should occur it would be impossible to calculate the correct frequencies of the different recorded signal levels.

It will be remembered that the difference in the signal levels on the oscillograph is proportional to the frequency difference therebetween. However, one of the frequencies must be known, e.g., the center frequency, in order to calculate the others. If the proper channel number could be placed on the calibration trace on the oscillograph record, the above-mentioned operator error would be eliminated. The frequency bands of each of the channels is known, and if the channel number is known then the center frequency may be determined and the frequency of the various signal levels can be calculated in the manner described hereinabove.

It is an object of this invention, therefore, to provide a trace identifier unit for identifying signals on an oscillograph record.

Another object of this invention is to provide a trace identifier unit for identifying signals on an oscillograph record and capable of causing the identification to be printed on the appropriate trace on said oscillograph record.

Still another object of this invention is to provide a trace identifier unit for simultaneously identifying a plurality of traces on an oscillograph record.

A further object of this invention is to provide a trace identifier unit for simultaneously identifying a plurality of traces on an oscillograph record, and printing binary coded identification numbers on said oscillograph record in pulse form.

A still further object of this invention is to provide a trace identifier unit for simultaneously identifying, in binary coded pulse form, the oscillograph records of a plurality of FM signals coming from discrete channels.

And another object of this invention is to provide a trace identifier unit for eliminating operator error in FM-FM processing of data signals.

The attendant advantages of this invention will be better appreciated and said invention will become clearly understood by reference to the following detailed description when considered in conjunction with the accompanying drawings, illustrating one embodiment of the instant invention, wherein.

Figure 1:
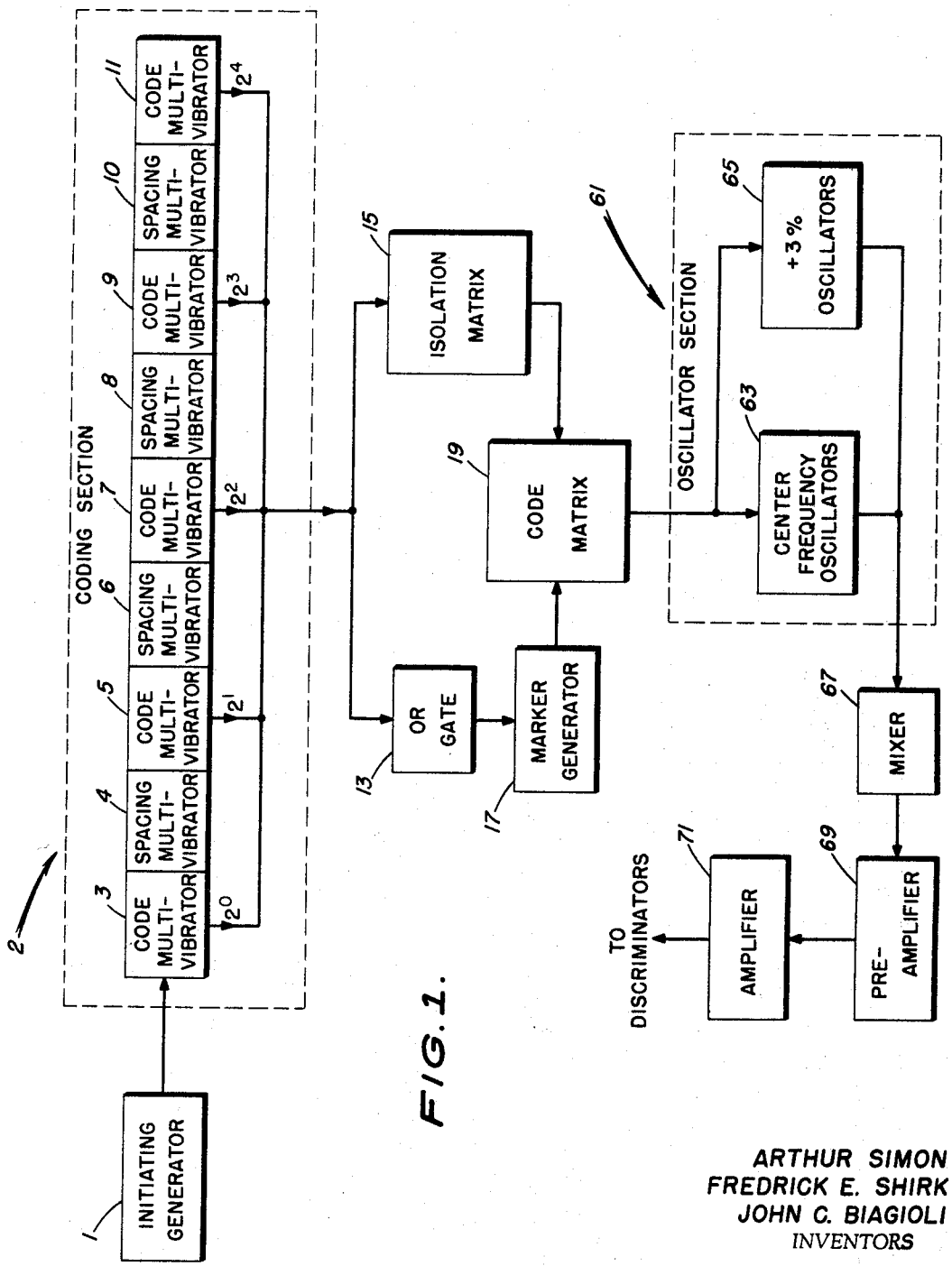
FIG. 1 is a functional block diagram of the instant invention.

Referring to the drawings in more detail, and more specifically to FIG. 1, an initiating generator, such as a well-known unijunction pulse generator network, is shown at 1, and delivers a negative 5 volt pulse every 2.5 seconds to start the coding cycle; the magnitude of the pulse and its frequency can be varied by suitably adjusting the network's resistance and capacitance. The output pulse from initiating generator 1 is fed to coding section 2, and specifically to code monostable multivibrator 3, which it triggers. Said output pulse causes monostable multivibrator 3 to change state and emit an output pulse 8 volts in amplitude and having a 250 milliseconds duration. Said output pulse of monostable multivibrator 3 is routed to several places, one of which is a differentiating network (not shown). This network shapes the pulse output of monostable multivibrator 3 so that its trailing edge triggers spacing monostable multivibrator 4. The output pulse of monostable multivibrator 4 is passed through a second differentiating network (not shown). The second differentiating network shapes the pulse output of spacing monostable multivibrator 4 so that its trailing edge triggers code monostable multivibrator 5.

The pulse output of monostable multivibrator 4 is of 150 milliseconds duration and serves to space the output pulse of monostable multivibrator 5 from that of monostable multivibrator 3.

In a like manner, code monostable multivibrator 5 triggers spacing monostable multivibrator 6; spacing monostable multivibrator 6 triggers code monostable multivibrator 7; the same process continuing for spacing monostable multivibrator 8, code monostable multivibrator 9, spacing monostable multivibrator 10, and code monostable multivibrator 11.

As each aforementioned code monostable multivibrator emits a pulse, said pulse is simultaneously applied directly, i.e., without differentiation, to an "or" gate 13, and an isolation matrix 15.

Said isolation matrix 15 comprises a plurality of emitter followers, each serving as a buffer amplifier to isolate the output from one of the code monostable multivibrators.

The output of the "or" gate 13 is a train of coding pulses corresponding in number to the number of code monostable multivibrators in coding section 2. This train of coding pulses is applied to a differentiating network (not shown), which shapes each pulse in the train of coding pulses so that it will trigger marker generator 17 on its leading edge. Said marker generator 17 is a monostable multivibrator which has an output pulse having an amplitude of 8 volts and a duration of 100 milliseconds. Thus, the train of pulses from "or" gate 13 are differentiated, each of said pulses triggers said marker generator 17 on its leading edge, and marker generator 17 emits a train of output pulses, each pulse having an amplitude of 8 volts and a duration of 100 milliseconds. The train of output pulses from marker generator 17, and those from isolation matrix 15 are simultaneously applied to a code matrix 19. It is to be noted at this point that the output pulses from code monostable multivibrators 3, 5, 7, 9, and 11 correspond to binary code positions $2^0$, $2^1$, $2^2$, $2^3$, and $2^4$ respectively.

Figure 2:
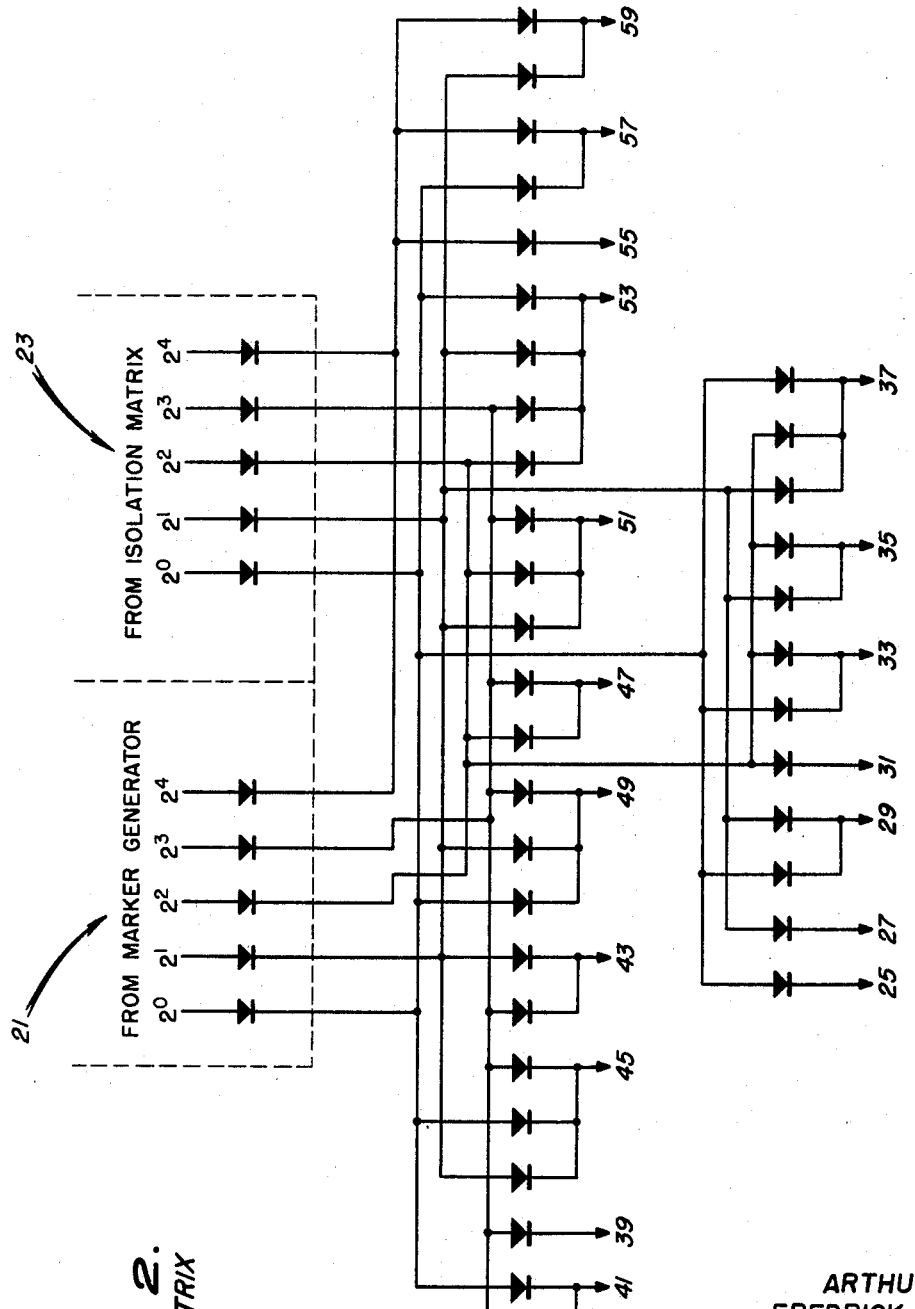
FIG. 2 is a schematic diagram of the code matrix employed in the instant invention.

As best seen in FIG. 2, said code matrix 19 includes an input 21 from marker generator 17, and an input 23 from isolation matrix 15.

Said input 21 comprises a plurality of diodes each corresponding to one of the binary positions $2^0$ through $2^4$. Input 21 is connected to marker generator 17, in a well-known manner, so that each output pulse from marker generator 17, which is originated by one of the code monostable multivibrators corresponding to one of the binary positions $2^0$ through $2^4$, is simultaneously applied to all of the diodes in said input 21, and appears across all of the binary positions $2^0$ through $2^4$. Likewise, input 23 comprises a plurality of diodes each corresponding to one of the binary positions $2^0$ through $2^4$. However, input 23 is connected to isolation matrix 15, in a well-known manner, so that an output pulse from one of the code monostable multivibrators, corresponding to one of the binary positions $2^0$ through $2^4$, will be applied only to the diode in input section 23 which corresponds to the same binary position, e.g., an output pulse from code monostable multivibrator 3, which corresponds to the $2^0$ binary position, will only appear across that diode in input 23 corresponding to the $2^0$ binary position.

Said code matrix 19 includes eighteen discrete outputs 25 through 59. Said discrete outputs 25 through 59 are connected to inputs 21 and 23 through a plurality of diodes, and in a well-known manner, such that each of the outputs 25 through 59 is connected to those input diodes (both in inputs 21 and 23) whose binary positions sum to the appropriate output number, e.g., output 25 (which is the first output) is connected to the binary $2^0$ diode in both input 21 and input 23, and output 59 (which is the eighteenth output) is connected to the binary $2^1$ and $2^4$ diodes in both input 21, and input 23. It will be remembered that binary $2^0$ corresponds to decimal 1, binary $2^1$ corresponds to decimal 2, and binary $2^4$ corresponds to decimal 16.

It will be recalled that the manner of connection between input 21 and marker generator 17 is such that any pulse output from marker generator 17 will be simultaneously applied to all the binary positions $2^0$ through $2^4$, and will appear across all outputs 25 through 59. However, the manner of connection between input 23 and isolation matrix 15 is such that pulses emanating from a particular binary position code monostable multivibrator will go only to certain outputs such that their numerical position is composed of that particular binary position, e.g., output 29 is the third output, and receives signals from the code monostable multivibrators coresponding to the binary $2^0$ and $2^1$ positions. All outputs having an odd numerical position, i.e., 1st, 3rd . . . 17th will receive pulses from code monostable multivibrator 3 which represents the binary $2^0$ position.

It is readily noted in the light of the above teachings that each and every output will emit a binary coded pulse train which repeats itself every 2.5 seconds, i.e., every time the initiating generator 1 emits an output pulse the code monostable multivibrators will sequentially emit pulses and the outputs 25 through 59 of said code matrix 19 will emit pulse trains having the numerical positions of the respective code matrix outputs in binary coded digital form. It is to be further noted that pulses emanating from the marker generator are considered "NO" pulses and those emanating from the isolation matrix "YES" pulses. The "YES" and "NO" pulses are readily distinguishable as the "YES" pulses have a duration of 250 milliseconds while the "NO" pulses have a duration of 100 milliseconds. For example, the eighteenth output, or output 59, emits a pulse train every 2.5 seconds consisting of a "NO" pulse followed by a "YES" pulse, two "NO" pulses, and a "YES" pulse, which is the binary coded equivalent of the number 18. The first pulse in any train corresponds to binary $2^0$, the second pulse to binary $2^1$, the third pulse to binary $2^2$, etc. Note that a "NO" pulse in any binary position corresponds to numerical zero while a "YES" pulse in any binary position corresponds to one multiplied by the numerical equivalent of that binary position, e.g., a "YES" pulse in the binary $2^3$ position corresponds to one multiplied by the numerical equivalent of binary $2^3$, or 8.

It was mentioned hereinabove that a pulse from marker generator 17, or "NO" pulse, always arrives at code matrix 19 simultaneously with a pulse from isolation matrix 15, or a "YES" pulse. Any output of code matrix 19 receives all the marker generator 17 pulses, but only receives certain pulses from the isolation matrix 15. Thus, when no pulse is being received from isolation matrix 15 by any particular output, said output continues to receive pulses from marker generator 17; however, because the pulses from isolation matrix 15 are of a greater duration than those from marker generator 17, whenever a particular output simultaneously receives pulses from said marker generator 17 and said isolation matrix 15, those pulses from marker generator 17 will be absorbed by the pulses from isolation matrix 15. It is readily apparent that the output pulses of marker generator 17 serve merely to identify the binary coded positions of those pulses from isolation matrix 15 appearing in the pulse train emanating from a particular output of code matrix 19. Indeed, the "or" gate 13 and the marker generator 17 might be eliminated from a particular embodiment of the instant invention; however, if such were the case additional modifications in the circuitry subsequent to the code matrix 19 might have to be made, and correct interpretation of the output pulse trains would be much more difficult.

Referring again to FIG. 1, an oscillator section is shown at 61 comprising eighteen center frequency oscillators 63 and eighteen plus three percent oscillators 65. Oscillators 63 and 65 are essentially unijunction transistors operating as free-running multivibrators. The center frequency oscillators 63 each run at the center frequency of one of the channel bands it is desired to identify, simultaneously. The plus three percent oscillators 65 each run simultaneously at a frequency three percent above a different one of the center frequency oscillators 63. Each one of the center frequency oscillators 63 is connected to one of the outputs of code matrix 19, and each of the oscillators 65 is likewise connected to one of the outputs of code matrix 19. It is irrelevant which center frequency oscillator 63 is connected to which code matrix 19 output, but once a particular center frequency oscillator is connected to a particular output of code matrix 19, its corresponding plus three percent oscillator 65 must be connected to the same output of code matrix 19. It is often desirable in practice to connect each of the center frequency oscillators 63 to the outputs of code matrix 19 in increasing order, i.e., the lowest frequency oscillator 63 to the first output of code matrix 19 (output 25) and the highest frequency to the eighteenth output of code matrix 19 (output 59); however, this is merely a matter of convenience and aesthetics and is not necessary for operation. Each of the oscillators 63 is connected to a particular output of code matrix 19 by means of an inverter section, and in a well-known manner. The oscillators 65 are similarly connected to the outputs of code matrix 19, but without the inverter sections. The nature of the oscillators 63 is such that they are normally running, however, the oscillators 65 are normally not running. The oscillators 65 are turned on by pulses received from their corresponding code matrix 19 outputs; these same pulses are inverted by the inverter section prior to reaching the corresponding center frequency oscillators 63, and thus shut off the center frequency oscillators 63. The output signals from the oscillators 63 and the oscillators 65 are fed to a resistive mixer 67 which multiplexes the signals of the 36 individual oscillators 63 and 65. It is readily seen that the oscillators 63 and 65 essentially serve to convert the binary coded digital outputs of the code matrix 19 to frequency modulated signals which are subsequently multiplexed together by resistive mixer 67.

The signal output of mixer 67 is fed to a preamplifier 69 which serves to provide sufficient amplification to the signal prior to its entry to the main line amplifier 71 which provides the drive for the subsequent circuitry. The signal output of amplifier 71 is fed to a patch network of discriminators.

It will be remembered that in calibrating the galvanometers the calibration signals from reference oscillators are passed through appropriate discriminators whose outputs go to different galvanometers for making oscillograph records of the calibration signals. The discriminators connect with the galvanometers in a patch panel; likewise, the calibration oscillators are patched to the discriminators as is the output of the trace identifier unit. After the galvanometers have been calibrated, and the oscillograph record obtained, the calibration oscillators are switched off and the trace identifier unit is switched on. The multiplexed FM signal output of the amplifier 71 is sent to the discriminators each of which picks out the FM information from the multiplexed signal which corresponds in carrier frequency to the band of the calibration signal which was previously detected by the same discriminator. Each discriminator converts the FM information back to binary coded digital information, and this binary coded pulse signal is applied to the same galvanometer that received the calibration signal from the particular discriminator. Thus a binary coded digital identification number is applied to each oscillograph trace. The same identification information is always applied to a particular discriminator whose detection band frequency is known. This identification number is applied to the oscillograph trace, thus enabling frequency identification of the calibration trace on the oscillograph record which, as described hereinabove, is necessary in the interpretation of the FM data received by the processing stations and recorded on the oscillograph records.

Figure 3:
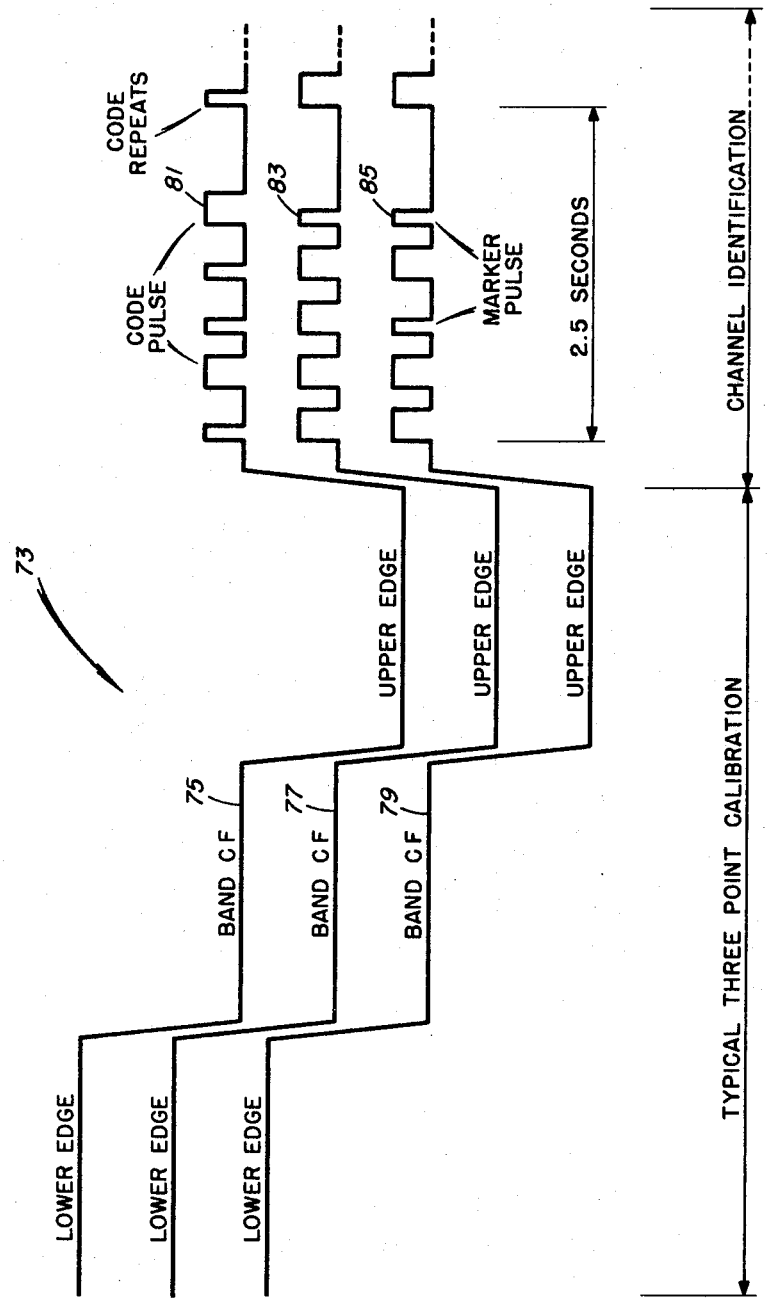
FIG. 3 is a wave-form diagram illustrating typical "three-point" calibration of the galvanometers for three discrete channels as it would appear on an oscillograph record.

Referring now to FIG. 3, a typical oscillograph record of a three-point calibration for three discrete channel bands is shown at 73. Three discrete channel bands are shown at 75, 77 and 79, including traces of the center frequency and upper and lower band edges for each of the channel bands 75, 77 and 79, including traces of the center frequency and upper and lower band edges for each of the channel bands 75, 77 and 79. The identification numbers (in binary code) for channel bands 75, 77 and 79 are shown at 81, 83, and 85 respectively. Interpretation of the binary coded identification numbers reveals that channel bands 75, 77 and 79 are channel bands corresponding to the discriminators, detecting signals controlled by outputs 59, 53, and 45 of code matrix 19, respectively. The frequency bands for the discriminators corresponding to the said outputs 59, 53, and 45 are known and, therefore, the frequencies of the FM information to be processed are readily discernible.

It is appropriate to emphasize at this point that a trace identifier has been described for eighteen discrete channel bands. The principles described are applicable to a system with any number of channel bands. The number of code monostable multivibrators can be increased or decreased to allow for a greater or lesser number of binary positions. Likewise, the number of spacing monostable multivibrators, oscillators, etc., can be appropriately varied for a particular adaptation.

It can readily be seen that many variations and modifications of the present invention are possible in the light of the aforementioned teachings, and it will be apparent to those skilled in the art that various changes in form and arrangement of parts may be made to suit requirements without departing from the spirit and scope of the invention. It is therefore to be understood that within the scope of the appended claims the instant invention may be practised in a manner otherwise than is specifically described herein.

What is claimed is:

1. A trace identifier for positively identifying the channel bands of signal traces recorded on oscillograph records, including an initiating generator for providing actuating pulses at one of a plurality of constant frequencies, a plurality of code monostable multivibrators connected to said actuating generator for receiving actuating signals therefrom and generating code or "YES" pulses in response thereto, a plurality of spacing monostable multivibrators connected to said code monostable multivibrators, for spacing the output pulses of said code monostable multivibrators, an "or" gate connected to said code monostable multivibrators for passing signals from each of said code monostable multivibrators, an isolation matrix connected to said code monostable multivibrators for isolating output signals therefrom, a marker generator connected to said "or" gate for receiving signals therefrom and generating marker pulses for determining the binary positions of the code pulses and providing "NO" pulses, a code matrix having a plurality of discrete outputs, connected to said marker generator and said isolation matrix for selecting, in binary numerical order, the correct marker and code pulses for each specific channel band, a plurality of center frequency oscillators each connected to a discrete output of said code matrix, and each generating signals at the center frequency of a discrete channel band, whereby signals from each output of said code matrix will temporarily turn off the center frequency oscillator connected thereto, a plurality of plus three percent oscillators each corresponding to one of said center frequency oscillators, each connected to the same discrete output of said code matrix as its corresponding center frequency oscillator, and each generating signals at the center frequency of its corresponding center frequency oscillator plus three percent, the manner of connection between said plus three percent oscillators and said code matrix will turn on said plus three percent oscillators, a mixer connected to said center frequency oscillators and said plus three percent oscillators for multiplexing the output signals of said center frequency oscillators and said plus three percent oscillators, an amplifier connected to said mixer for amplifying the multiplexed signal from the mixer to give it adequate driving power, and a plurality of discriminators connected to said amplifier, each having a discrete channel band corresponding to the channel bands of said signal traces.

2. A trace identifier for positively identifying the channel bands of signal traces recorded on oscillograph records, including means for providing actuating pulses at one of a plurality of constant frequencies, means for receiving said actuating signals and generating binary coded code or "YES" pulses in response thereto, means for spacing said code pulses, means for receiving said code pulses and generating marker or "NO" pulses in response thereto for determining the binary positions of said code pulses, means for receiving and selecting in binary numerical order the correct marker and code pulses for identifying each specific channel band, means for intermittently generating signals at the center frequency of each of said channel bands in response to said code signals and said marker signals, means for intermittently generating signals at the center frequency of each of said channel bands plus three percent, alternately with said center frequency signals, in response to said code signals and said marker signals, means for multiplexing said center frequency signals and said center frequency plus three percent signals, means for amplifying the signal from said multiplexing means, and means for selectively detecting the information carried by said multiplexed signal and converting this information to discrete binary coded digital representations of the numbers of each of said discrete channel bands for identifying the channel band numbers of said signal traces recorded on oscillograph records.

3. A trace identifier for positively identifying the channel bands of signal traces recorded on oscillograph records, including means for providing actuating pulses at one of a plurality of constant frequencies, means for receiving said actuating signals and generating binary coded code or "YES" pulses in response thereto, means for receiving said code pulses and generating marker or "NO" pulses in response thereto for determining the binary positions of said code pulses, means for receiving and selecting in binary numerical order the correct marker and code pulses for identifying each specific channel band, means for intermittently generating signals at the center frequency of each of said channel bands in response to said code signals and said marker signals, means for intermittently generating signals at the center frequency of each of said channel bands plus three percent, alternately with said center frequency signals, in response to said code signals and said marker signals, means for multiplexing said center frequency signals and said center frequency plus three percent signals, means for amplifying the output signal from said multiplexing means, and means for selectively detecting the information carried by said multiplexed signal and converting this information to discrete binary coded digital representations of the numbers of each of said discrete channel bands for identifying the channel band numbers of said signal traces recorded on oscillograph records.

4. A trace identifier for positively identifying the channel bands of signal traces recorded on oscillograph records, including means for providing actuating pulses at one of a plurality of constant frequencies, means for receiving said actuating signals and generating binary coded code or "YES" pulses in response thereto, means for spacing said code pulses, means for receiving said code pulses and generating marker or "NO" pulses in response thereto for determining the binary positions of said code pulses, means for receiving and selecting in binary numerical order the correct marker and code pulses for identifying each specific channel band, means for intermittently generating signals at the center frequency of each of said channel bands in response to said code signals and said marker signals, means for intermittently generating signals at the center frequency of each of said channel bands plus three percent, alternately with said center frequency signals, in response to said code signals and said marker signals, means for multiplexing said center frequency signals and said center frequency plus three percent signals, and means for selectively detecting the information carried by said multiplexer signal and converting this information to discrete binary coded digital representations of the numbers of each of said discrete channel bands for identifying the channel band numbers of said signal traces recorded on oscillograph records.

5. A trace identifier for positively identifying the channel bands of signal traces recorded on oscillograph records, including means for providing actuating pulses at one of a plurality of constant frequencies, means for receiving said actuating signals and generating binary coded code or "YES" pulses in response thereto, means for receiving said code pulses and generating marker or "NO" pulses in response thereto for determining the binary positions of said code pulses, means for receiving and selecting in binary numerical order the correct marker and code pulses for identifying each specific channel band, means for intermittently generating signals at the center frequency of each of said channel bands in response to said code signals and said marker signals, means for intermittently generating signals at the center frequency of each of said channel bands plus three percent, alternately with said center frequency signals, in response to said code signals and said marker signals, means for multiplexing said center frequency signals and said center frequency plus three percent signals, and means for selectively detecting the information carried by said multiplexed signal and converting this information to discrete binary coded digital representations of the numbers of each of said discrete channel bands for identifying the channel band numbers of said signal traces recorded on oscillograph records.

6. A trace identifier for positively identifying the channel bands of signal traces recorded on oscillograph records, including
- means for providing actuating pulses at one of a plurality of constant frequencies,
- means for receiving said actuating signals and generating binary coded code or "YES" pulses in response thereto,
- means for receiving said code pulses and generating marker or "NO" pulses in response thereto for determining the binary positions of said code pulses,
- means for receiving and selecting in binary numerical order the correct marker and code pulses for identifying each specific channel band,
- means for converting said binary coded "YES" and "NO" pulse signals into multiplexed frequency modulated information, and
- means for selectively detecting the information carried by said multiplexed frequency modulated signal and converting this information to discrete binary coded digital representations of the numbers of each of said discrete channel bands for identifying the channel band numbers of said signal traces recorded on oscillograph records.

7. The invention as recited in claim 1, wherein said marker generator comprises a monostable multivibrator.

8. The invention as recited in claim 1, wherein said code matrix comprises a plurality of diodes.

9. The invention as recited in claim 2, wherein said means for providing actuating pulses comprises a unijunction pulse generator.

10. The invention as recited in claim 2, wherein said binary numerical order selection means comprises a diode matrix.

11. The invention as recited in claim 3, wherein said means for providing actuating pulses comprises a unijunction pulse generator, and said binary numerical order selection means comprises a diode matrix.

12. The invention as set forth in claim 4, wherein said binary numerical order selection means comprises a diode matrix, and said multiplexing means comprises a resistive mixer.

13. In combination with a system for processing and detecting frequency modulated telemetered signals and recording the detected information as traces on an oscillograph record, a tract identified for identifying and recording on the traces on said oscillograph record the number of the channel band of origin of the respective traces, including
- means for generating and selecting in binary numerical order the correct marker and code pulses for identifying each said channel band in binary digital code,
- means for converting said binary digital pulse identification information into frequency modulated information, and
- means for detecting said frequency modulated information and converting it back into binary coded digital pulse information for application to the appropriate oscillograph traces.

14. The invention as recited in claim 13, wherein said generating and selecting means includes a diode matrix.

15. The invention as set forth in claim 13, wherein said means for converting from digital information to frequency modulated information comprises a plurality of oscillators.

16. The invention as recited in claim 13, wherein said generating and selecting means includes a unijunction pulse generator.

17. The invention as related in claim 13, wherein said generating and selecting means includes
- a unijunction pulse generator for providing actuating pulses at one of a plurality of constant frequencies,
- means for receiving said actuating signals and generating binary coded code or "YES" pulses in response thereto,
- means for receiving said code pulses and generating marker or "NO" pulses in response thereto for determining the binary positions of said code pulses, and
- a diode matrix for receiving and selecting in binary numerical order the correct marker and code pulses for identifying each specific channel band.

18. The invention as set forth in claim 17, wherein said means for converting from digital information to frequency modulated information comprises a plurality of oscillators.

19. The invention as set forth in claim 17, wherein said means for converting from digital information to frequency modulated information additionally comprises a resistive mixer.

References Cited

UNITED STATES PATENTS 3,273,128   9/1966   Ruthazer.
3,030,168   4/1962   Hurvitz _____ 340—2.07 XR JOHN W. CALDWELL, *Primary Examiner.*

DONALD J. YUSKO, *Examiner.*